(12) United States Patent
Puntambekar (10) Patent No.: US 11,667,162 B2
(45) Date of Patent: Jun. 6, 2023

(54) APPARATUS AND METHOD FOR DETERMINING AIRCRAFT TIRE PRESSURE

(71) Applicant: AIRBUS SAS, Blagnac (FR)

(72) Inventor: Anand Puntambekar, Karnataka (IN)

(73) Assignee: AIRBUS SAS, Blagnac (FR)

( * ) Notice: Subject to any disclaimer, the term of this patent is extended or adjusted under 35 U.S.C. 154(b) by 28 days.

(21) Appl. No.: 17/515,061

(22) Filed: Oct. 29, 2021

(65) Prior Publication Data

US 2022/0185039 A1    Jun. 16, 2022

(30) Foreign Application Priority Data

Dec. 10, 2020   (IN) .............................. 202041053843

(51) Int. Cl.
*B60C 23/04* (2006.01)

(52) U.S. Cl.
CPC ...... *B60C 23/0476* (2013.01); *B60C 23/0444* (2013.01); *B60C 23/0479* (2013.01); *B60C 2200/02* (2013.01)

(58) Field of Classification Search
CPC ............ B60C 2200/02; B60C 23/0408; B60C 23/0479; B60C 23/043; B60C 23/04; B60C 23/0474; B60C 23/0486; B60C 23/20; B60C 23/0476; B60C 23/0488; B60C 23/0433; B60C 23/00; B60C 23/0498; B60C 23/0496; B60C 23/0413; B60C 23/0416; B60C 23/0427; B60C 23/0428; B60C 23/0471; B60C 23/02; B60C 23/0493; B60C 23/0454; B60C 23/0481; B60C 23/0444; B60C 23/041; B60C 1/0016; B60C 23/0422; B60C 23/0459; B60C 23/0461; B60C 23/0477; B60C 23/0406; B60C 23/0447; B60C 23/0405;

(Continued)

(56) References Cited

U.S. PATENT DOCUMENTS 8,599,044 B2   12/2013   Maggiore et al.
9,139,090 B1   9/2015   Huang
(Continued)

FOREIGN PATENT DOCUMENTS

EP   1 393 934   3/2004
EP   3 069 904   9/2016
(Continued)

OTHER PUBLICATIONS

European Search Report cited in EP 21203404.5 dated Mar. 30, 2022, 10 pages.
Search Report for GB2101138.2 dated Jun. 25, 2021, 5 pages.

*Primary Examiner* — Andre J Allen
(74) *Attorney, Agent, or Firm* — Nixon & Vanderhye P.C.

(57) ABSTRACT

An apparatus configured to determine the pressure of an aircraft tire at a reference temperature. The apparatus includes a processing system configured to: obtain a measured tire pressure and a measured temperature associated with the measured tire pressure; and determine a tire pressure at the reference temperature by adjusting the measured tire pressure using a predetermined temperature characteristic, a square root of the measured temperature and a square root of the reference temperature. The predetermined temperature characteristic is a gradient of the relationship between square root of temperature and tire pressure.

17 Claims, 6 Drawing Sheets

(58) Field of Classification Search
CPC .......... B60C 23/0484; B60C 23/00354; B60C 23/0411; B60C 23/0494; B60C 23/0425; B60C 23/0452; B60C 15/0018; B60C 19/00; B60C 23/045; B60C 23/0457; B60C 23/00363; B60C 23/0401; B60C 23/0483; B60C 23/002; B60C 23/00318; B60C 23/10; B60C 115/06; B60C 23/001; B60C 23/009; B60C 23/0415; B60C 23/042; B60C 23/0467; B60C 23/06; B60C 23/004; B60C 23/0455; B60C 23/061; B60C 15/05; B60C 23/0403; B60C 23/0469; B60C 23/0472; B60C 23/064; B60C 9/023; B60C 11/246; B60C 15/04; B60C 23/0442; B60C 29/068; B60C 23/00336; B60C 9/22; B60C 15/024; B60C 2019/004; B60C 23/066; B60C 9/18; B60C 11/1612; B60C 15/0009; B60C 23/127; B60C 29/06; B60C 9/20; B60C 11/1606; B60C 23/00345; B60C 23/04985; B60C 29/02; B60C 9/0042; B60C 1/00; B60C 11/00; B60C 15/0072; B60C 2009/1871; B60C 23/0491; B60C 3/00; B60C 9/263; B60C 9/28; B60C 13/001; B60C 23/0437; B60C 23/0462; B60C 11/0058; B60C 11/16; B60C 17/01; B60C 17/06; B60C 19/122; B60C 2009/0092; B60C 2015/0614; B60C 2200/04; B60C 23/003; B60C 23/00372; B60C 23/006; B60C 23/007; B60C 9/08; B60C 11/0008; B60C 15/02006; B60C 15/0632; B60C 2009/0466; B60C 2011/0016; B60C 2015/0657; B60C 2015/0678; B60C 23/0445; B60C 23/0449; B60C 23/137; B60C 23/19; B60C 5/08; B60C 5/20; B60C 11/0083; B60C 11/0306; B60C 11/04; B60C 11/243; B60C 17/02; B60C 2019/006; B60C 23/0423; B60C 23/0432; B60C 23/0438; B60C 23/044; B60C 23/0489; B60C 23/16; B60C 29/00; B60C 29/062; B60C 3/04; B60C 5/02; B60C 5/22; B60C 9/00; B60C 9/0007; B60C 9/2009; B60C 1/0025; B60C 11/005; B60C 11/01; B60C 11/02; B60C 11/032; B60C 11/0332; B60C 11/1346; B60C 11/24; B60C 13/002; B60C 15/00; B60C 15/0203; B60C 15/0607; B60C 17/04; B60C 2001/0066; B60C 2011/0341; B60C 2011/0355; B60C 2011/0381; B60C 23/005; B60C 23/008; B60C 23/0464; B60C 25/132; B60C 29/064; B60C 7/10; B60C 9/0292; B60C 9/06; B60C 9/1807; B60C 9/2204; B60C 1/0041; B60C 11/0066; B60C 11/14; B60C 13/00; B60C 15/0603; B60C 17/00; B60C 17/044; B60C 17/066; B60C 17/103; B60C 19/003; B60C 19/08; B60C 2001/0083; B60C 2009/0085; B60C 2009/0276; B60C 2009/0425; B60C 2009/0441; B60C 2009/045; B60C 2009/0458; B60C 2009/0475; B60C 2011/0025; B60C 2015/009; B60C 2015/061; B60C 2015/0621; B60C 2016/0625; B60C 2019/005; B60C 2200/06; B60C 2200/065; B60C 2200/08; B60C 2200/12; B60C 2200/14; B60C 23/062; B60C 23/08; B60C 23/131; B60C 23/18; B60C 3/08; B60C 5/00; B60C 5/008; B60C 5/04; B60C 5/10; B60C 5/24; B60C 7/06; B60C 7/125; B60C 7/20; B60C 9/0057; B60C 9/02; B60C 9/07; B60C 99/00
USPC .................................................. 73/146–146.8
See application file for complete search history.

(56) References Cited

U.S. PATENT DOCUMENTS

| | | | |
|---|---|---|---|
| 9,895,943 B2 | 2/2018 | Bill | |
| 10,183,534 B2 | 1/2019 | Bill | |
| 10,449,812 B2 | 10/2019 | Smith et al. | |
| 10,596,867 B2 | 3/2020 | Bill | |
| 2003/0074961 A1 | 4/2003 | Fischer et al. | |
| 2015/0091720 A1* | 4/2015 | Graf | B60C 23/0476 340/443 |
| 2016/0272021 A1* | 9/2016 | Bill | B60C 23/0486 |
| 2017/0096037 A1 | 4/2017 | Smith et al. | |
| 2019/0118587 A1 | 4/2019 | Shoyama | |
| 2019/0184772 A1 | 6/2019 | Bill et al. | |
| 2020/0277086 A1* | 9/2020 | Arnoux | B64F 5/60 |
| 2022/0134812 A1* | 5/2022 | Bill | B60C 23/0477 701/32.7 |
| 2022/0139119 A1* | 5/2022 | Bill | B60C 23/0477 701/29.2 |
| 2022/0185459 A1* | 6/2022 | Robertson | B60C 23/20 |

FOREIGN PATENT DOCUMENTS

| | | |
|---|---|---|
| GB | 2540414 | 1/2017 |
| GB | 2586213 | 2/2021 |
| WO | 2015/143451 | 9/2015 |

* cited by examiner

APPARATUS AND METHOD FOR DETERMINING AIRCRAFT TIRE PRESSURE

RELATED APPLICATION

This application claims priority to and incorporates entirely by reference Indian patent application IN 202041053843, filed Dec. 10, 2020.

TECHNICAL FIELD

The present invention relates to determining tire gas pressure of aircraft tires.

BACKGROUND

Monitoring of tire inflation pressures is an important part of aircraft maintenance. An over- or under-inflated tire is more likely to burst during take-off and/or landing and a tire burst can cause significant damage to surrounding aircraft structures. Tire pressure checks are therefore mandated to be carried out at regular intervals for commercial aircraft.

Current methods of tire pressure checking include manual methods (using a pressure gauge to measure each individual tire manually) and automated methods (interrogating pressure sensors attached to each wheel to measure the associated tire pressure).

In order to give a reliable result, tire pressure should be measured when the gas in the tire is at ambient temperature. If the tire is above ambient temperature this will increase the measured pressure, so that a tire requiring maintenance may not be correctly identified. If the tire pressure is measured when "hot" or above ambient temperature, the additional gas temperature above ambient will mean that the pressure is higher so that under-inflation is not detected. It can take a long time for the gas in the tire to reach ambient temperature because it is subject to heating from nearby brake system components, such as brake discs, radiating heat while they cool even though the aircraft is standing. This may also impact the safety of manual measurements taken in proximity to hot components. Airbus therefore require waiting at least three hours with the aircraft standing before carrying out a tire pressure measurement.

This three-hour requirement can impose significant operational constraints, especially when turnaround is short, so the opportunity to take a tire pressure measurement may be restricted. For example it may only be possible when the aircraft is not in use overnight and has stood for the required amount of time. Some aircraft operating on long haul routes may be in flight overnight and typically have a turnaround time of less than three hours, making the required three hour wait difficult to schedule.

Automated pressure sensing devices affixed to an aircraft wheel may include a temperature sensor, but this does not measure the gas temperature directly. The nature of fixation to the wheel means that although pressure is sensed directly, temperature is measured indirectly, by a temperature sensor within the sensing device. The temperature sensor is indirectly coupled to the gas in the tire, it therefore cannot be assumed that the temperature measured is the same as the gas temperature in the tire.

It would be desirable to improve aircraft tire maintenance and/or pressure measurement.

SUMMARY

According to a first aspect, there is provided an apparatus configured to determine the pressure of an aircraft tire at a reference temperature. The apparatus comprises a processing system configured to: obtain a measured tire pressure and a measured temperature associated with the measured tire pressure; and determine a tire pressure at the reference temperature by adjusting the measured tire pressure using a predetermined temperature characteristic, a square root of the measured temperature and a square root of the reference temperature. The predetermined temperature characteristic is a gradient of the relationship between square root of temperature and tire pressure.

Automated pressure sensing devices have allowed data to be collected on the behaviour of aircraft tires in a way not previously available. Data can be gathered automatically at many different points in the daily operation of an aircraft. One insight from such data is that when tire gas pressure and an associated temperature are measured, such as by a tire monitoring device affixed to the wheel, the pressure follows a generally linear trend with the square root of the measured temperature, so that a single pressure measurement can be corrected to a desired reference pressure. The gradient can be predetermined and then used to correct a pressure measurement to a desired temperature. This relationship to the square root of temperature is unexpected and demonstrates the more complex relation between a measured temperature and pressure. A single measurement is required, from which a tire pressure at a reference temperature can be determined without having to wait three hours. In addition to the operational benefits, this also allows steady state pressures to be determined more frequently than once every three days, giving safety benefits.

Using this apparatus, a measured pressure can be converted into a pressure expressed at a reference temperature without a need to wait for three hours for the gas pressure and temperature to stabilise and wheel and brake components to cool. Any suitable reference temperature can be used, for example 15° C., 20° C., etc. and there is no limitation on a number of reference temperatures which can be used.

The apparatus can take several forms, including: an avionics system, a flight computer or cockpit system in an aircraft; a maintenance system or server; and a handheld device, such as a handheld computing device.

Optionally, the processing system is configured to compare the tire pressure to a threshold; and provide an alert based on the comparison. Such a comparison and alert can increase safety and prompt maintenance of the tire when action is required, such as reinflation. The threshold may be a reinflation threshold, indicating a pressure below which a tire should be reinflated. The threshold may also be a replacement threshold, indicating a pressure below which a tire should be replaced. In some examples, the threshold is dependent on the wheel position, for example it may be different for Nose Landing Gear compared to Main Landing Gear reflected the different recommended inflation pressures between those positions. The alert can be a visual, audio, or haptic alert and/or combinations. For example, a visual warning may be provided in the aircraft cockpit and/or on a display of a maintenance apparatus.

Optionally, the measured tire pressure and the measured temperature correspond to a point in the flight cycle where temperature is substantially at a minimum This allows good determination of the pressure at the reference temperature because the influence of any heat in the system is reduced. For example, the measured tire pressure and measured temperature may correspond to a point in time close to touchdown, such as within 5 minutes, 3 minutes or 1 minute from touchdown. At this point the cooling effect of flight is maximised (especially the low temperature at altitude). The data used can be from shortly after touchdown as well as before because after touchdown there has been limited time for the heat of landing (such as tire flexure, friction and braking) to transfer to the gas in the tire. In aircraft including a tire monitoring system which is integrated into the aircraft control and data systems, this data could be obtained from an Aircraft Condition Monitoring System (ACMS) report which gathers data from touchdown. Other systems may be triggered to gather the data at the point of touchdown, for example when accelerometer data associated with a wheel or landing gear is indicative of the forces present on touch down.

Optionally, the predetermined temperature characteristic is derived from past data of measured tire pressure and measured temperature at the same point in the flight cycle of the aircraft. For example, the predetermined temperature characteristic can be derived from real data of past test-flights, such as past data at the time of touchdown. The predetermined temperature characteristic can also be updated over time, as more data from touch downs is gathered to calculate it.

The past data from which the predetermined temperature characteristic is derived may be specific to one or more of a particular tire type, a particular tire model, and wheel (such as a wheel position). A tire type can be one or more of tire manufacturer, tire model, tire rating, and tire construction. Other examples may additionally or alternatively use past data from aircraft for one or more of a particular geographic region (e.g. touchdowns in a particular country or area), a particular aircraft operator, a particular maintenance provider, a particular aircraft manufacturer, and a particular aircraft model. This can allow a more accurate temperature characteristic reflecting differences in operation and use. As automated tire monitoring systems become more commonplace, the required past data can be gathered relatively quickly from normal operations.

Some examples may include a learning or calibration period during which sufficient data is gathered to allow a reliable predetermined temperature characteristic to be determined. For example, it has been found that a clear correlation can be observed from a data set with as few as 100 readings. 100 readings might take less than a month to acquire from a short haul aircraft undertaking several flights a day. In some cases, the characteristic may be specific to a particular aircraft and derived from data recorded in use on that aircraft.

As well as using past data from operational flights to derive the characteristic, the characteristic can also be derived from test flight data. Such test flight data may form an initial data set to calculate the predetermined temperature characteristic and subsequently be supplemented or refined using data from operational flights.

Optionally, the processing system may be configured to: determine a future tire pressure a predetermined time period in the future using the tire pressure at the reference temperature and a predetermined time characteristic, wherein the predetermined time characteristic comprises a gradient and an offset for the predetermined time in the future. The time period in the future could be, for example, 1 day, 2 days, 3 days, 4 days, 5 days or 10 days. This allows future inflation pressure to be predicted, which can assist with maintenance planning Optionally, the predetermined time characteristic is derived from past measurement data of measured tire pressure and measured temperature. For example the time characteristic can be derived using pairs of measurement data separated by the desired time period, without reinflation in between. So, for a time period of 1 day, pairs of data separated by around 1 day or 24 hours may be used.

Optionally, the processing system is further configured to determine that the future tire pressure is below a threshold and provide an alert. This could be the same threshold as described above (such as a reinflation threshold or a replacement threshold). Some examples may use a different threshold, for example the threshold may be adjusted to be higher to reflect the uncertainty in the estimate.

According to a second aspect, there is provided a method of determining the pressure of an aircraft tire at a reference temperature. The method comprises: obtaining a measured tire pressure and a measured temperature associated with the measured tire pressure; and determining a tire pressure at the reference temperature by adjusting the measured tire pressure using a predetermined temperature characteristic, a square root of the measured temperature and a square root of the reference temperature, wherein the predetermined temperature characteristic is a gradient of the relationship between square root of temperature and tire pressure.

According to a third aspect, there is provided an aircraft maintenance system comprising: a communication interface to obtain a measured tire pressure and a measured temperature associated with the measured tire pressure; and a processor. The processor is configured to determine a tire pressure at the reference temperature based on the measured tire pressure using a predetermined temperature characteristic, a square root of the measured temperature, and a square root of the reference temperature. The predetermined temperature characteristic is a gradient of the relationship between square root of temperature and tire pressure.

It will be appreciated that any of the features of the first aspect can equally be applied to the second and third aspects.

BRIEF DESCRIPTION OF THE DRAWINGS

Embodiments of the invention will now be described, by way of example only, with reference to the accompanying drawings, in which.

DETAILED DESCRIPTION

Figure 1:
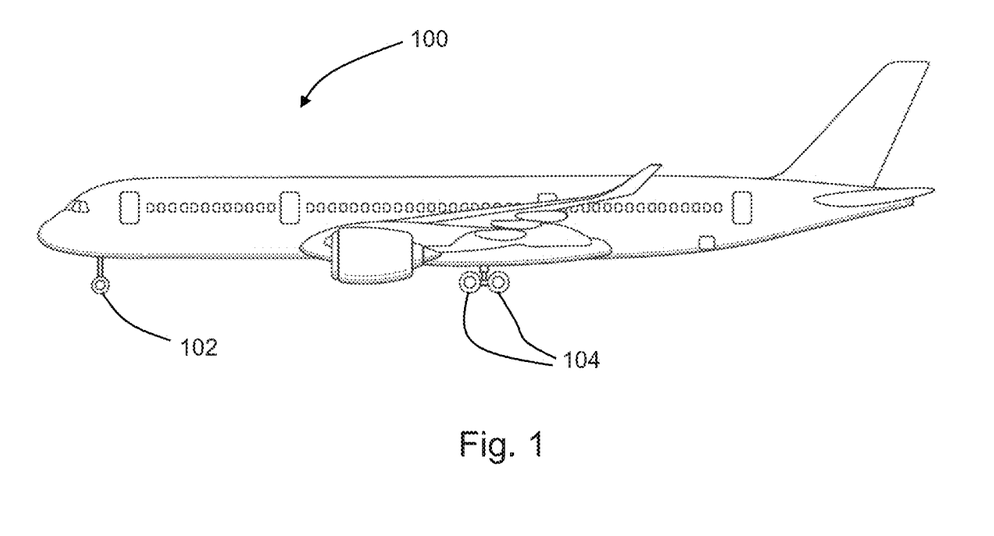
FIG. 1 shows a schematic view of an aircraft with which embodiments can be practiced.

FIG. 1 depicts an aircraft in which embodiments of the invention may be practiced. The aircraft 100 includes nose landing gear with tires 102 and main landing gear with tires 104. During use and operation of the aircraft it is important that the tires 102, 104 remain inflated to the correct pressure. Incorrectly inflated tires can burst unexpectedly, leading to potential safety issues. As will be explained in more detail below, embodiments of the invention receive data on the measured tire pressure and calculate a current pressure expressed at a reference temperature and/or in the future. Once the tire pressure at the reference temperature is determined, it can be compared to acceptable limits and thresholds, with maintenance actions, such as reinflation, scheduled as needed. FIG. 1 depicts an aircraft with a single aisle, in this case an Airbus A350. It will be appreciated that the invention can be applied to any aircraft.

Each tire 102, 104 is provided with a tire monitoring device. The tire monitoring device records pressure and an associated temperature at various times. For example, the tire monitoring device may generate and save the data at regular intervals, or at defined specific events such as touchdown.

The aircraft 100 may also include other systems which provide sensor data in addition to the tire monitoring devices. While much of this is used for flight control purposes, some data can also be useful for determining steady-state tire pressure, such as sensor data for measuring aircraft loading. Data from all sensors in the aircraft may be aggregated into a single data system that can provides reports of sensor status at regular intervals times or when particular events occur. Alternatively, or additionally, the sensors in the tires may be interrogated separately from other aircraft systems. More detail of the systems which can receive the sensor data and use it to determine tire pressure will now be described with reference to FIGS. 2 to 4.

Figure 2:
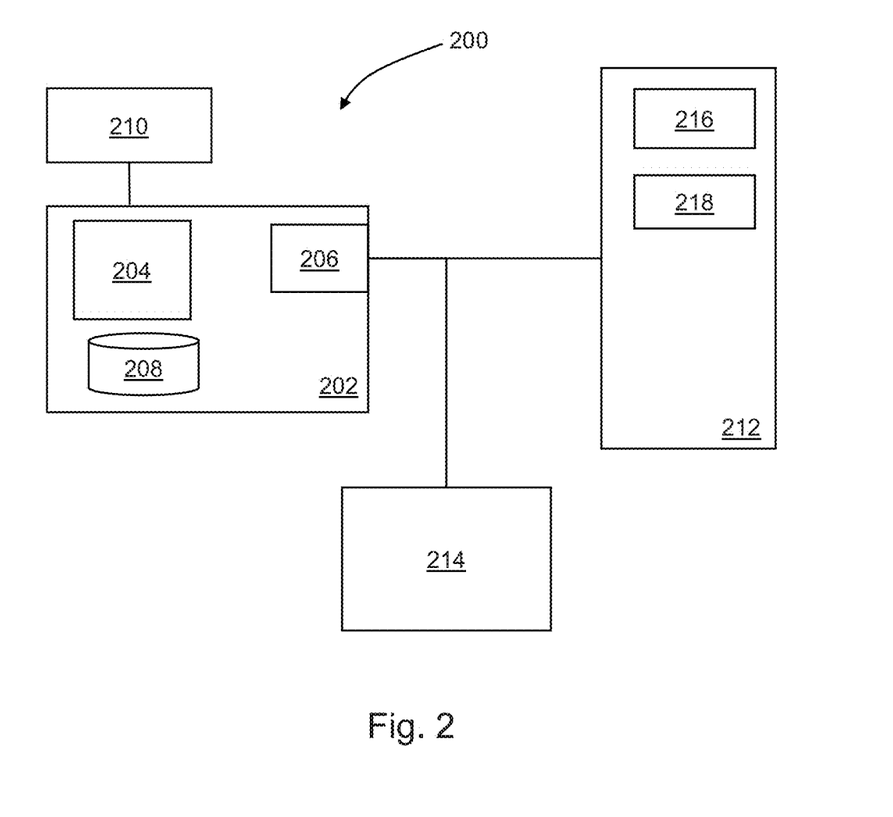
FIG. 2 shows a schematic view of an aircraft cockpit information system including a tire pressure sensor.

FIG. 2 depicts an aircraft tire monitoring system 200. The system comprises a cockpit system 202, which comprises a processor 204, a communication interface 206 and a storage 208. The processor 204 can be any suitable processor, including single or multi-core processors, processing systems, and so on. Storage 208 is a solid state drive or hard drive which can store both computer program instructions for execution by the processor 204 and data received from the sensor systems throughout the aircraft. The communication interface 206 is a wired communication interface connected via a data network to sensors throughout the aircraft. Cockpit system 202 is also connected to a display 210 located in the cockpit. Via the display 210, the cockpit system 202 can display information and/or warnings.

The communication interface 206 receives data from sensors located throughout the aircraft. This includes tire monitoring devices 212 and other sensors, such as load sensor 214. For clarity only a single tire monitoring device 212 and load sensor 214 is depicted. It will be appreciated that there may be more than one of these items, for example each tire of the aircraft will usually have an associated tire monitoring device 212.

The tire monitoring device 212 includes a temperature sensor 216 and a gas pressure sensor 218. The gas pressure sensor 218 is configured to measure the gas pressure within the tire. The temperature sensor 216 is not in direct contact with the gas in the tire so measures a temperature indicative of the gas temperature, rather than the actual gas temperature. Tire gas pressure is proportional to the gas temperature, but as the gas temperature is not measured directly, it is difficult to convert a measured gas pressure to a pressure at a known reference temperature. This makes it difficult to compare the measured pressure against an expected reference pressure for safe operation. As a result, it is currently mandated that an aircraft must stand for three hours to allow the tire, wheel and brake systems to reach a steady state where the effect of heat from landing are reduced. As will be explained in more detail below, embodiments of the present invention apply novel techniques to analyse data from tire pressure sensors so that the likely tire pressure at a reference temperature can be determined without having to wait for three hours.

The cockpit system 202 can obtain information from the sensors directly via communication interface 206 and/or retrieve historical data from storage 208. The processor 204 may then process this data to determine a tire pressure at a reference temperature. Once this is known, it can be compared to safety thresholds, with a warning provided via the display 210 if a threshold has been exceeded.

The cockpit system 202 can provide a variety of warnings or indications depending on the determined pressure at the reference temperature. For example, reinflation of a tire may be recommended once tire gas pressure has fallen to below 95% of a recommended inflation pressure. If the tire gas pressure has fallen below 90% of the recommended inflation pressure, then replacement of the tire may be indicated. In this way, the cockpit information system can indicate urgent maintenance requirements which may affect safety to the pilot.

In some cases, the cockpit system may also analyse historical trends. For example, the rate of change in the tire pressure at the reference temperature over time might be determined. Using the methods described herein, the steady state pressure can be determined without having to wait for three hours, so it can potentially be determined for every flight cycle. An information, warning or alert may be given via the display if the pressure trend suggests that the pressure will fall below one of the thresholds in the future. For example, the tire pressure trend may indicate that although the current measured tire pressure is acceptable, it will fall below 95% in two days, so that the tire should be reinflated within the next two days.

Figure 3:
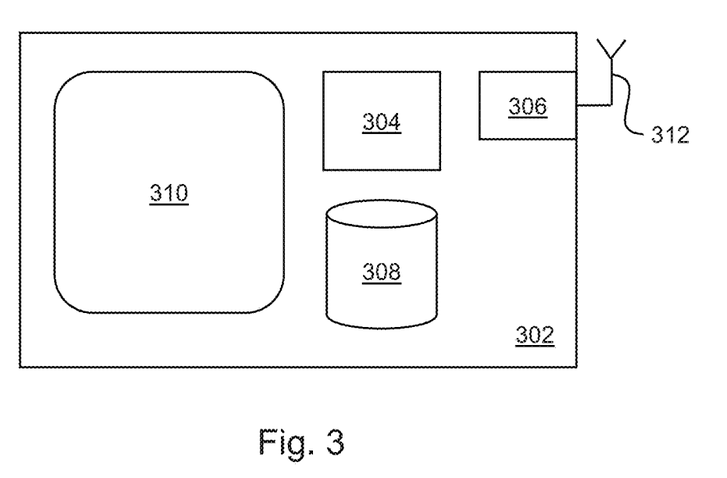
FIG. 3 shows a schematic view of a handheld device interfacing with a tire pressure sensor.

In the system 200 of FIG. 2, the processing and warnings are carried out using a cockpit system 202. This is convenient for providing warnings to the pilots, but is less convenient for maintenance crew. For example, maintenance crew are less likely to be inside the cockpit to receive the information or warnings on the display. In the embodiment of FIG. 3, a handheld device 302 replaces the cockpit system 202. The handheld device 302 may be a portable computing device, such as a smart phone, tablet or laptop computer and comprises a communication interface 304, which is a wireless communication interface having an antenna 312 in this case, and a processor 306 with storage 308 in a similar way to the cockpit information system 202. However, because the handheld device is more portable, it can be carried to a location where maintenance is required. The handheld device is not permanently connected to the sensor systems within the aircraft. It may obtain the sensor data by directly querying the sensors themselves, such as directly querying tire monitoring devices which themselves store a history of measurement data. Alternatively, or additionally, the handheld device may also query the cockpit system 202 to receive sensor data.

Once the handheld device has received the data, it can process it in much the same way as the cockpit system 202 described above. For example, the handheld device can provide warnings on a display 310 of the hand held device.

Figure 4:
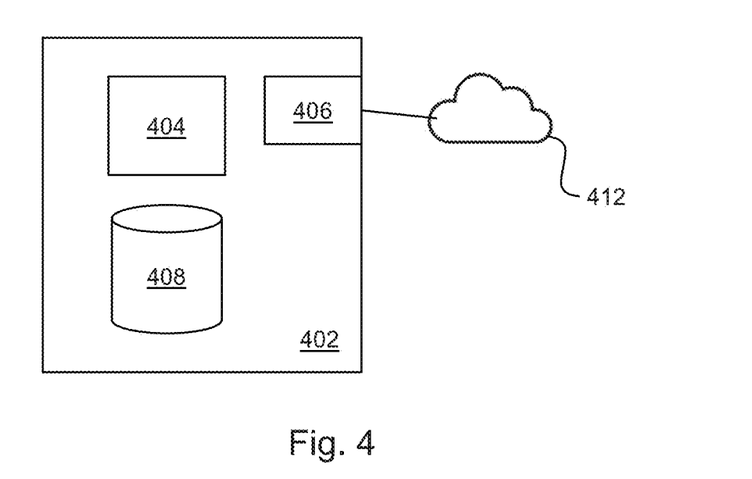
FIG. 4 shows a maintenance system interfacing with a tire pressure sensor.

Both the cockpit system 202 and the handheld device 302 operate in the vicinity of the aircraft. In the embodiment of FIG. 4 a remote maintenance system 402, in this case a remote maintenance server, replaces the cockpit system 202. Rather than being located in the vicinity of the aircraft, the maintenance server 402 is remote from the aircraft. Similar to the cockpit system it comprises a processing system 404, a communication interface 406, and a storage 408. The maintenance system 402 receives sensor data via the communication interface 406, for example data may be uploaded from an aircraft when aircraft maintenance is carried out via the internet 412, perhaps by relaying via the hand held device 302 of the embodiment of FIG. 3. The maintenance system 402 may also receive data from the aircraft, for example a wireless data connection for telemetry. Such a telemetry connection can send sensor data at regular intervals regardless of whether maintenance is carried out.

Maintenance server 402 can provide alerts and indications in various ways. For example, information may be provided to a service center operative via a web page or email system. Maintenance server 402 may also use the received sensor data to schedule maintenance actions based on the sensor data, such as tire reinflation or replacement.

Methods to determine tire gas pressure at a reference temperature without having to wait for at least three hours for the tire gas to cool will now be described. The coolest point for tire gas in a flight cycle is generally just before touchdown. This provides a good point for analysis of tire pressure because the wheel system (including the tire and brake) is generally closer to a steady state when cooler, so the temperature data more closely approximates the tire gas temperature at this point in the flight cycle. Data collected from a large number of test flights has shown a correlation between the tire gas pressure and the square root of temperature at the point around touchdown.

Figure 5A:
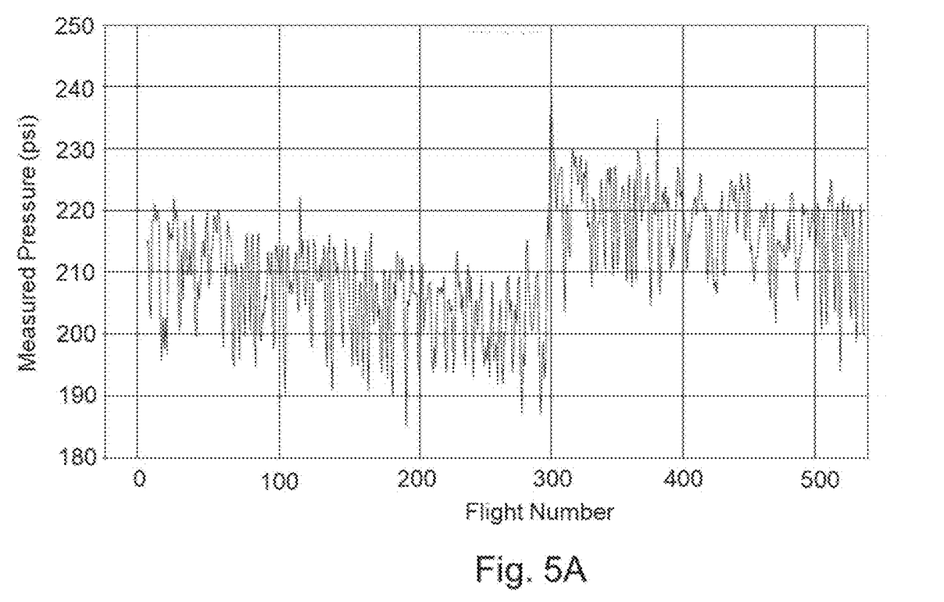
FIG. 5A shows a set of pressure data measured at touchdown for the same aircraft tire across around 500 flights.
Figure 5B:
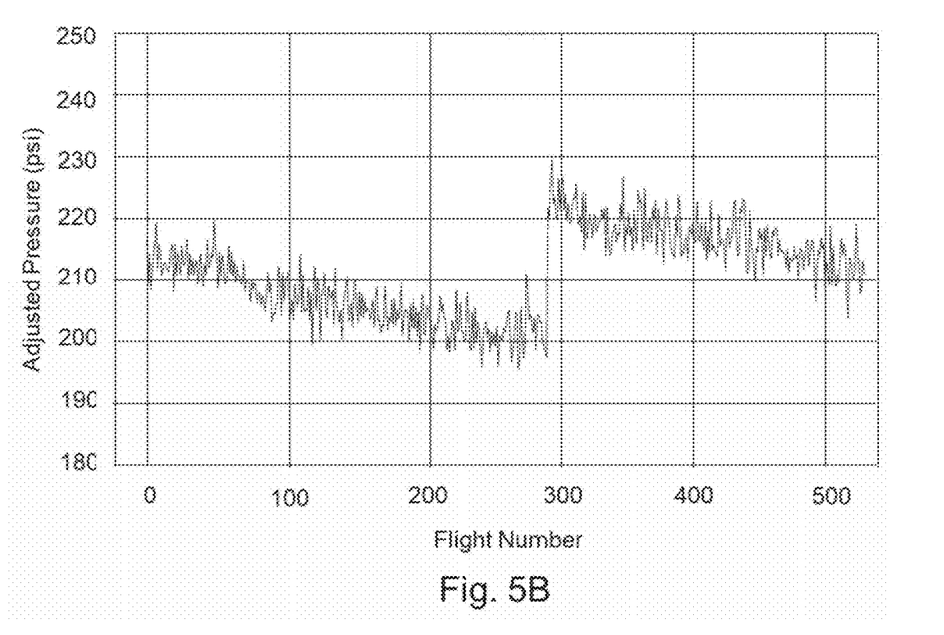
FIG. 5B shows the set of pressure data of FIG. 5A adjusted using the method described herein to be expressed at the same square root of measured temperature.
Figure 6:
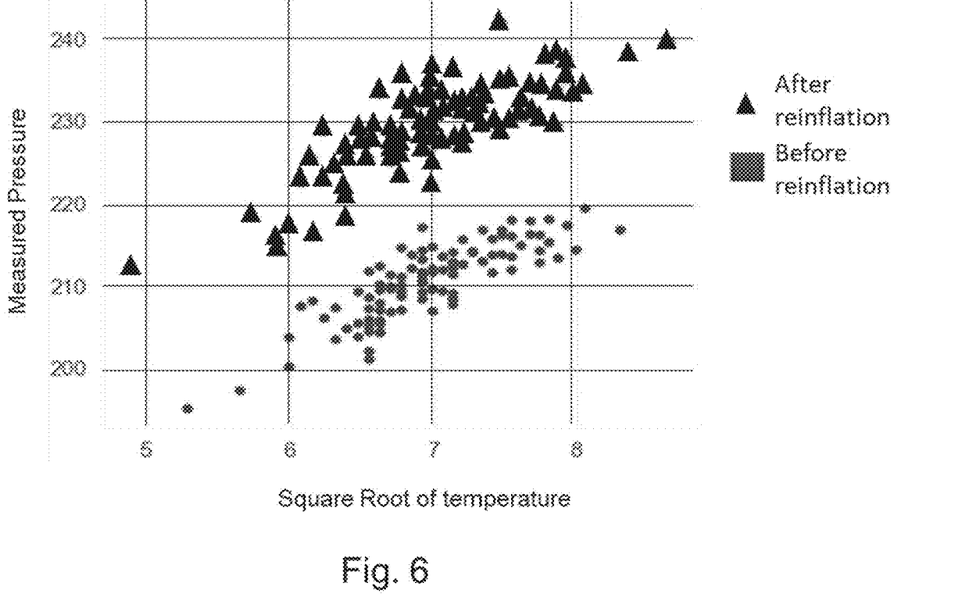
FIG. 6 is a scatter plot of measured pressure against the square root of measured pressure, showing two populations of around 100 flights before and after reinflation of the tire.

FIG. 5A shows a set of pressure data measured at touchdown for the same aircraft tire across around 500 flights. The tire was reinflated around flight 300. It can be seen that the data shows significant variation, although the reinflation is clearly visible as a general shift in the baseline pressure. FIG. 5B shows the same set of pressure data adjusted to be expressed at the same square root of measured temperature. Each pressure measurement was associated with a temperature measurement, T. To adjust the data, the square root of the temperature, $\sqrt{T}$, (expressed in ° C.) was taken and the overall mean determined (in this case, the mean square root of temperature was around 6.5). Linear regression was used to determine the gradient between the square root of the measured temperature and the measured pressure. This gradient was then used to normalise each measured pressure to be expressed at the mean square root of temperature by adjusting the measured pressure using the gradient until the square root temperature matched the mean square root temperature. (Another baseline for normalisation could equally have been used.) As can be seen from a comparison of FIGS. 5A and 5B, this technique significantly reduces the variation in the data A subset of the data around the tire reinflation was then analysed, taking the 100 samples immediately before and after the reinflation. The effect of reinflation can be seen clearly in FIG. 6, which shows measured pressure values. There are two populations of data, one with generally higher pressure (after reinflation) and one with generally lower pressure (before reinflation). Both sets of data had similar gradients, showing that the gradient is preserved across reinflation of the tire and so has general application to adjusting tire pressure.

Using these results, a new method of correcting measured tire gas pressure to be expressed at a reference temperature is proposed. Historical data of measured tire pressure and temperature at the same point in the flight in flight cycle are analysed to determine the gradient of the trendline, a, for example by using linear regression. Measured pressure can then be normalised to be expressed at a reference temperature using the following relationship:

$$P_{ref} = P_m - a(\sqrt{T_m} - \sqrt{T_{ref}})$$

where $P_{ref}$ is a pressure expressed at a reference temperature $T_{ref}$ in ° C. or K, a is the gradient of the trend line, for example calculated by linear regression, $P_m$ is the measured pressure and $T_m$ is the associated measured temperature in ° C. This relationship can be used to compare measured tire pressure at a reference temperature using data obtained on touchdown or close to touchdown, such as within 30 seconds, 1 minute or 2 minutes. There is no need to wait for three hours before measuring the pressure, it is available no matter how short the turnaround time is at the airport.

A similar relationship has been observed in historical data for how tire gas pressure changes over time, whereby analysis of the historical data gives a predetermined trend which can be used to predict likely tire gas pressure in the future from a current measurement. To calculate the trend, historical data pairs separated by the desired period in the future are first identified. For example, touch downs 24 hours apart, 48 hours apart and so on may be identified. The present method of prediction has been shown to work up to 10 days ahead, although the accuracy of prediction decreases as the period into the future becomes longer.

Each data pair is normalised to a reference temperature with the method discussed above (using a gradient and the square root of temperature) and the difference in pressure between the two data points is calculated. This difference in pressure is then plotted against the initial adjusted pressure (i.e. the earliest pressure in the pair, normalised to the reference pressure). From this data, linear regression is used to determine a trend line with a gradient, b, and an intercept, c. This can then be used to predict the change in pressure over time, starting from an adjusted pressure measurement, $P_{adj}$, according to the following relation:

$$\Delta P = b P_{adj} + c$$

$\Delta P$ is the predicted change in tire gas pressure over the time period, b is the gradient of the trend line from the historical data analysis and c is the intercept.

Figure 7:
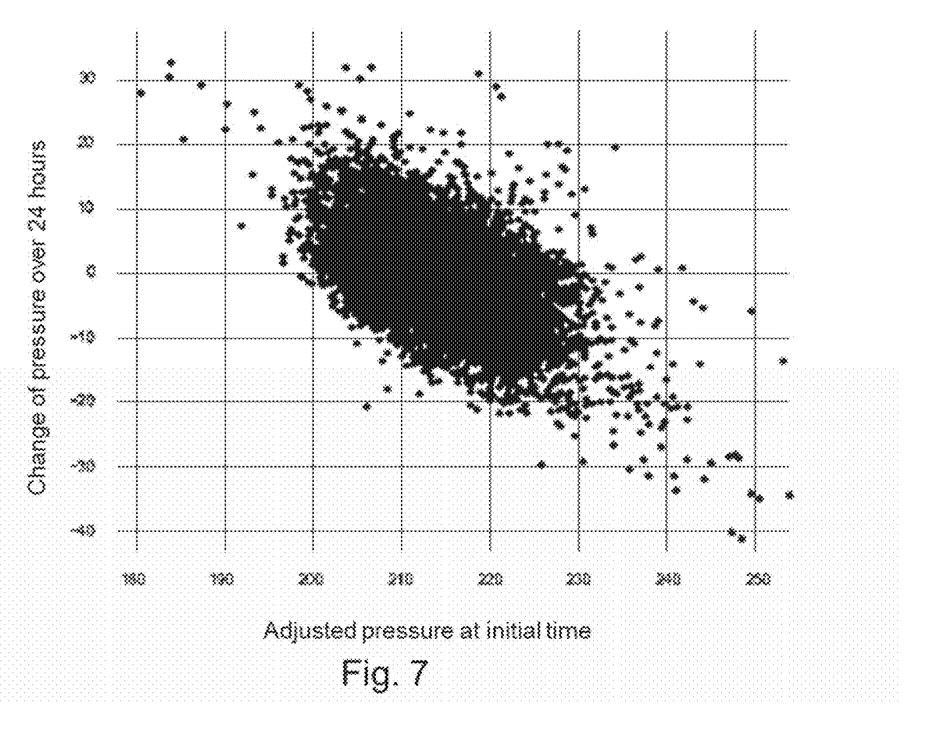
FIG. 7 is a scatter plot of fight data showing the initial adjusted pressure against the change in pressure in psi over 24 hours.

A scatter plot of the initial adjusted pressure against the change in pressure over 24 hours is shown in FIG. 7. Similar plots can be obtained for pairs of data separated by different time periods. From the data a line was fitted using linear regression and the gradient b (slope) and intercept c noted. The intercepts apply when the temperature is expressed in ° C. The results are given in Table 1 below. It can be seen that different slopes and intercepts apply to each period of time, so the gradient and intercept are specific to the time period in question.

TABLE 1

Gradients and intercepts for predicting future tire pressure

| Time period (hours) | Gradient (b) | Intercept (a) |
|---|---|---|
| 24 | −0.47 | 97.95 |
| 48 | −0.51 | 107.50 |
| 72 | −0.56 | 117.62 |
| 96 | −0.59 | 124.78 |
| 120 | −0.62 | 130.88 |
| 144 | −0.63 | 133.66 |
| 168 | −0.65 | 136.42 |

TABLE 1-continued

Gradients and intercepts for predicting future tire pressure

| Time period (hours) | Gradient (b) | Intercept (a) |
|---|---|---|
| 192 | −0.66 | 138.64 |
| 216 | −0.66 | 138.64 |
| 240 | −0.66 | 140.04 |

To verify the accuracy of the method, the relation was applied to the measured data it was derived from, and an error between the predicted change in pressure and the actual change in pressure was calculated. A standard deviation of the error was then determined. The results are shown in the table below:

TABLE 2

Standard deviation of errors in predicted tire pressure

| Time period (Hours) | Standard deviation of the error in the change of adjusted tire pressure (psi) |
|---|---|
| 24 | 5.80 |
| 48 | 6.03 |
| 72 | 6.17 |
| 96 | 6.33 |
| 120 | 6.37 |
| 144 | 6.43 |
| 168 | 6.46 |
| 192 | 6.45 |
| 216 | 6.51 |
| 240 | 6.51 |

The standard deviation of the error increases as the time period gets longer, but it is still a useful prediction.

In another embodiment, the probability of the pressure being above a particular threshold at a point can be estimated from the data set of adjusted pressure pairs. For example, if a tire pressure has been measured as an adjusted pressure of 227 psi and the threshold of reinflation is 206 psi, then the data can be used to calculate the probability of the pressure being above 206 psi. Data pairs starting from an adjusted pressure of 227 psi are identified and the probability of the pressure being 206 psi in the time period calculated. An example graph showing this can be seen in FIG. 8.

Figure 8:
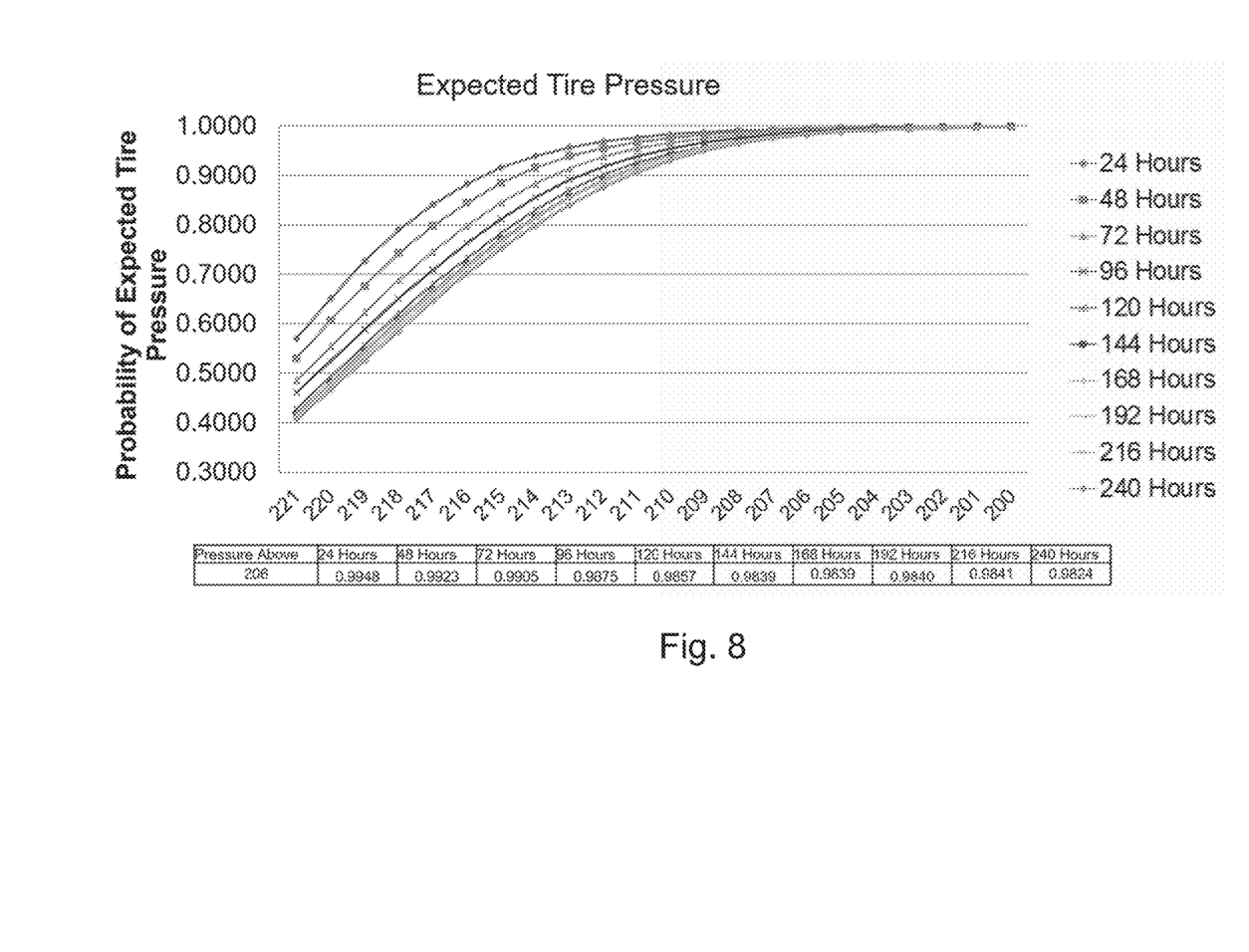
FIG. 8 is a graph showing the probability of tire pressure being above a particular pressure after different periods of time.

FIG. 8 shows that for an adjusted tire pressure measurement of 227 psi, there is a probability 0.9948 it will be at least 206 psi in 24 hours and a probability of 0.9824 that it will be at least 206 psi in 240 hours. These probabilities can inform maintenance decisions. For example, a probability threshold can be set to indicate when reinflation of the tire is likely to be necessary so that maintenance to reinflate the tire can be scheduled.

Figure 9:
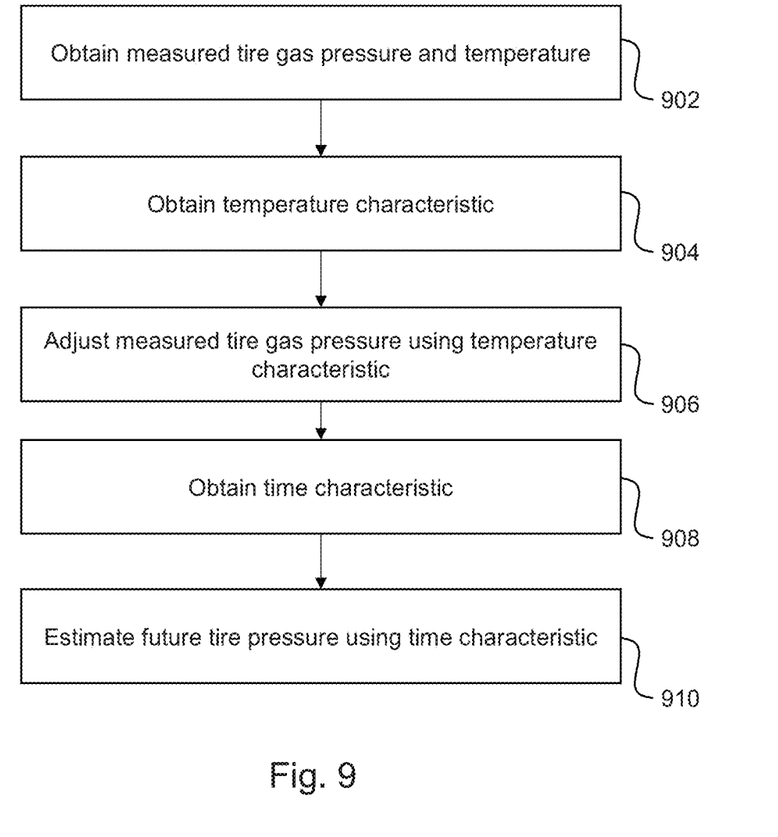
FIG. 9 is flow chart of a method according to an embodiment.

FIG. 9 depicts a method according to an embodiment which may be implemented by an apparatus, such as the cockpit system, handheld device and remote maintenance server described above. First, at block 902, the measured tire gas pressure and temperature are obtained. As discussed above, these are preferably from a time around touchdown. The data may already be available, for example stored in storage by a cockpit system, or may be received in response to a query from the sensors themselves. In some cases, the information may be sent automatically when a touchdown is detected. Existing sensor data and/or sensor reports may be suitable, such as those from an Aircraft Condition Monitoring System (ACMS), Flight Operations and Maintenance Exchanger (FOMAX) or Customer Support Test Tool (CSTT). These systems may provide the sensor data in any suitable way, for example via a direct connection to a maintenance device, or via a remote connection, such as a mobile data connection, to a remote server. In any case, the measured data is obtained and stored ready for processing.

Next, at block 904, the temperature characteristic is obtained. The temperature characteristic is predetermined as discussed above, so that the measured temperature can be adjusted and expressed in at a common square root temperature to allow comparison with other data. Next, at step 906, the measured tire gas pressure is adjusted using the temperature characteristic.

Optionally (not depicted in FIG. 9) action may be taken based on the adjusted tire gas pressure. For example, if the adjusted pressure is under a predetermined threshold, such as 95% of the ideal pressure, a warning or alert can be provided, indicating that reinflation off the tire should take place. Other thresholds may also be used. For example, a threshold of 90% of the ideal pressure may indicate that a tire should be replaced with an appropriate warning or alert provided.

At block 908, a time characteristic is obtained. The time characteristic may be for a single period in the future, such as 24 hours ahead, or for multiple periods. Where multiple periods are used, multiple time characteristics will be obtained. The, at block 910, the future tire pressure is estimated using the time characteristic as discussed above with reference to FIG. 7. Depending on the value of the predicted future tire pressure, a warning or alert can be provided.

Although the blocks of FIG. 9 are discussed in a particular order, it will be appreciated that other embodiments may use a different order. For example, the time characteristic may be obtained simultaneously with, or before, the temperature characteristic. Other embodiments may omit steps 908 and 910 and simply calculate the adjusted tire gas pressure.

Further embodiments of the method of FIG. 9 may, additionally or alternatively. calculate a probability of a tire gas pressure being below a threshold value in the future, following the methodology discussed above with reference to FIG. 8. This probability may then result in an alert or indication being provided, for example if the probability of the tire meeting the threshold is below an acceptable risk level.

In some embodiments of FIG. 9, the historical data may be obtained as well as current data the and the temperature characteristic and/or the time characteristic may be determined each time. This will require more computing power and data transfer than using predetermined versions be may be more accurate to reflect the specific characteristics of each individual wheel system (including the tire and brake). For example and tire may have been affixed in a way which causes its pressure to drop at a different rate than another of the aircraft tires.

As has been discussed above, the embodiments described herein provide an alternative reference system for comparing measured tire pressures. Rather than seek to adjust a measured gas temperature based on an associated temperature at the time of the measurement, the adjustment is made based on the square root of the associated temperature. In some examples the associated temperature is a brake temperature. Similarly, reference pressures used as thresholds for tire maintenance decisions may be expressed at a predetermined square root of the brake temperature rather than a gas temperature. It has been found that this system exhibits lower variation in measurements when values are adjusted to be expressed at the same square root of the brake temperature according to a calculated trend line. Additional advantages can also be obtained from this method. For example, the reference square root temperature may be chosen as the mean of the data used to calculate a trend line. This means that, across a data population, minimum adjustments are made to the temperatures improving accuracy. In contrast, existing methods rely on temperatures close to ambient for ease of measurement.

It is to be noted that the term "or" as used herein is to be interpreted to mean "and/or", unless expressly stated otherwise.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus configured to determine a pressure of an aircraft tire at a reference temperature, the apparatus comprising a processing system configured to:
   obtain a measured tire pressure in the aircraft tire and a measured temperature associated with the measured tire pressure; and
   determine the tire pressure at the reference temperature by adjusting the measured tire pressure using a predetermined temperature characteristic, a square root of the measured temperature and a square root of the reference temperature, wherein the predetermined temperature characteristic is a gradient of a relationship between the square root of tire temperature and tire pressure.

2. The apparatus according to claim 1, wherein the processing system is configured to:
   compare the tire pressure to a threshold; and
   provide an alert based on the comparison.

3. The apparatus according to claim 1, wherein the measured tire pressure and the measured temperature correspond to a point in a flight cycle where an ambient temperature of an aircraft to which the aircraft tire is mounted is at or near a minimum of the ambient temperature during the flight cycle.

4. The apparatus according to claim 1, wherein the predetermined characteristic is derived from past data of the measured tire pressure and the measured temperature.

5. The apparatus according of claim 1, wherein the predetermined characteristic is specific to one or more of an aircraft model, a tire type and a wheel type of an aircraft.

6. The apparatus according to claim 1, wherein the processing system is configured to:
   estimate a future tire pressure corresponding to a predetermined future time period using the tire pressure at the reference temperature and a predetermined time characteristic, wherein the predetermined time characteristic comprises a gradient and an offset for the predetermined future time period.

7. The apparatus according to claim 6, wherein the predetermined time characteristic is derived from past measurement data of the measured tire pressure and the measured temperature.

8. The apparatus according to claim 6, wherein the processing system is further configured to determine whether the future tire pressure is below a threshold and provide an alert if the future tire pressure is below the threshold.

9. A method of determining a pressure of an aircraft tire at a reference temperature, the method comprising:
   obtaining a measured tire pressure in the aircraft tire and a measured temperature associated with the measured tire pressure; and
   determining a tire pressure at the reference temperature by adjusting the measured tire pressure using a predetermined temperature characteristic, a square root of the measured temperature and a square root of the reference temperature, wherein the predetermined temperature characteristic is a gradient of a relationship between the square root of tire temperature and tire pressure.

10. The method of claim 9, further comprising providing an alert based on a determination that the tire pressure at the reference temperature is below a threshold.

11. The method of claim 9, wherein the measured tire pressure and the measured temperature correspond to a point in a flight cycle, of an aircraft to which the aircraft tire is mounted, where an ambient temperature of the aircraft is at or near a minimum ambient temperature during the flight cycle.

12. The method of claim 9, wherein the predetermined temperature characteristic is derived from past data of the measured tire pressure and the measured temperature.

13. The method of claim 9, wherein the predetermined temperature characteristic is specific to one or more of an aircraft model, a tire type, and a wheel type.

14. The method of claim 9, further comprising:
   estimating a future tire pressure at a predetermined future time period using the tire pressure at the reference temperature and a predetermined time characteristic, wherein the predetermined time characteristic comprises a gradient and an offset for the predetermined future time period.

15. The method of claim 14, wherein the predetermined time characteristic is derived from past measurement data of the measured tire pressure and the measured temperature.

16. The method of claim 14, further comprising providing an alert when a determination is made that the future tire pressure is below a threshold.

17. An aircraft maintenance system comprising:
   a communication interface configured to obtain a measured tire pressure of a tire on an aircraft and a measured temperature associated with the measured tire pressure; and
   a processor configured to estimate a tire pressure at a reference temperature based on the measured tire pressure and using a predetermined temperature characteristic, a square root of the measured temperature, and a square root of the reference temperature;
   wherein the predetermined temperature characteristic is a gradient of the relationship between the square root of temperature and tire pressure.

* * * * *